US010747943B2

(12) United States Patent
Weng et al.

(10) Patent No.: US 10,747,943 B2
(45) Date of Patent: Aug. 18, 2020

(54) METHOD, DEVICE, CLIENT APPARATUS, AND ELECTRONIC DEVICE FOR PRESENTING WEBPAGES

(71) Applicant: GUANGZHOU UCWEB COMPUTER TECHNOLOGY CO., LTD., Guangzhou (CN)

(72) Inventors: Yuedong Weng, Guangzhou (CN); Jundong Chen, Guangzhou (CN); Wenjin Wang, Guangzhou (CN); Shuqi Zeng, Guangzhou (CN); Xianfeng Li, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 0 days.

(21) Appl. No.: 16/047,303

(22) Filed: Jul. 27, 2018

(65) Prior Publication Data

US 2019/0079908 A1 Mar. 14, 2019

(30) Foreign Application Priority Data

Sep. 14, 2017 (CN) .......................... 2017 1 0829229

(51) Int. Cl.
*G06F 17/00* (2019.01)
*G06F 40/14* (2020.01)
*G06F 16/957* (2019.01)
*G06F 40/154* (2020.01)

(52) U.S. Cl.
CPC ............ *G06F 40/14* (2020.01); *G06F 16/957* (2019.01); *G06F 40/154* (2020.01)

(58) Field of Classification Search
CPC .. G06F 17/2247; G06F 17/227; G06F 16/957; G06F 40/14; G06F 40/154; G06F 16/951; G06F 16/9577; G06F 16/958
See application file for complete search history.

(56) References Cited

U.S. PATENT DOCUMENTS

| | | | |
|---|---|---|---|
| 7,860,749 B2 * | 12/2010 | Subramanian | G06Q 30/0633 705/26.3 |
| 7,912,917 B2 * | 3/2011 | Chakra | G06F 17/243 709/217 |
| 9,201,665 B2 * | 12/2015 | Catalahana | G06F 9/451 |
| 9,235,330 B2 * | 1/2016 | Naderi | G06F 3/0481 |
| 9,285,977 B1 | 3/2016 | Greenberg et al. | |
| 9,355,081 B2 | 5/2016 | Zhang et al. | |
| 9,507,480 B1 | 11/2016 | Hui et al. | |
| 9,563,613 B1 * | 2/2017 | Dinkel | G06F 17/227 |
| 9,582,601 B2 * | 2/2017 | D'Aurelio | G06F 16/986 |
| 9,645,992 B2 * | 5/2017 | Ahmed | G06F 17/243 |
| 9,697,187 B2 * | 7/2017 | Baldwin | G06F 17/2247 |

(Continued)

*Primary Examiner* — Laurie A Ries
(74) *Attorney, Agent, or Firm* — Sheppard Mullin Richter & Hampton LLP

(57) ABSTRACT

A method, a device, a client apparatus, and an electronic device for presenting webpages are disclosed. The method comprises: receiving webpage data; obtaining, based on page presentation-related interface information in the webpage data, corresponding interface elements of a local application; and at least partially using the interface elements of the local application to present a webpage of the webpage data. User experience can be improved according to some embodiments of the present disclosure.

17 Claims, 3 Drawing Sheets

(56) References Cited

U.S. PATENT DOCUMENTS

| | | |
|---|---|---|
| 9,773,264 B2 * | 9/2017 | Brown ............... G06F 3/04817 |
| 10,431,208 B2 * | 10/2019 | Miller ................ H04N 21/4668 |
| 2005/0234874 A1 * | 10/2005 | Berlin .................. G06F 40/103 |
| 2007/0214422 A1 | 9/2007 | Agarwal et al. |
| 2008/0163202 A1 * | 7/2008 | Kembel ............... G06F 3/0484 717/178 |
| 2010/0076851 A1 * | 3/2010 | Jewell, Jr. ............ G06Q 30/02 705/14.67 |
| 2010/0205551 A1 * | 8/2010 | Underwood .......... G06Q 10/10 715/760 |
| 2010/0281475 A1 | 11/2010 | Jain et al. |
| 2011/0047453 A1 * | 2/2011 | Catalahana ............. G06F 9/451 715/236 |
| 2011/0078678 A1 | 3/2011 | Matthews |
| 2011/0138295 A1 | 6/2011 | Momchilov et al. |
| 2012/0042271 A1 | 2/2012 | Ma et al. |
| 2012/0084638 A1 * | 4/2012 | Calvin .................. G06F 17/24 715/234 |
| 2012/0096345 A1 | 4/2012 | Ho et al. |
| 2012/0159310 A1 | 6/2012 | Chang et al. |
| 2012/0284632 A1 | 11/2012 | Baird |
| 2013/0132856 A1 | 5/2013 | Binyamin et al. |
| 2013/0212489 A1 * | 8/2013 | Ivashin .................. G06F 3/038 715/753 |
| 2013/0246932 A1 | 9/2013 | Zaveri et al. |
| 2013/0290856 A1 | 10/2013 | Beveridge et al. |
| 2014/0082512 A1 | 3/2014 | Neuert et al. |
| 2014/0096014 A1 | 4/2014 | Johnson et al. |
| 2014/0281883 A1 * | 9/2014 | Burckart ............. G06F 16/972 715/234 |
| 2014/0310590 A1 * | 10/2014 | Nguyen .............. G06F 17/2247 715/234 |
| 2014/0331124 A1 * | 11/2014 | Downs ................. G06F 17/212 715/243 |
| 2014/0351684 A1 | 11/2014 | Smit et al. |
| 2015/0039999 A1 * | 2/2015 | Chasman ............... H04L 67/10 715/234 |
| 2015/0081611 A1 * | 3/2015 | Shivakumar ........ G06F 16/9535 706/46 |
| 2016/0103576 A1 * | 4/2016 | Zhang .................. G06F 3/0481 715/853 |
| 2018/0046602 A1 * | 2/2018 | Sisson ..................... G06F 17/24 |
| 2018/0091546 A1 * | 3/2018 | Davidson ........... G06F 17/2247 |
| 2018/0121339 A1 * | 5/2018 | Mayers .............. G06F 11/3688 |
| 2018/0196885 A1 * | 7/2018 | Kim ..................... G06F 16/958 |
| 2019/0065444 A1 * | 2/2019 | Sitaraman .......... G06F 17/2247 |
| 2019/0278815 A1 * | 9/2019 | Capon ................ G06F 17/2247 |

* cited by examiner

METHOD, DEVICE, CLIENT APPARATUS, AND ELECTRONIC DEVICE FOR PRESENTING WEBPAGES

CROSS-REFERENCE TO RELATED APPLICATIONS

This application claims the benefits of and priority to Chinese Patent Application No. CN 201710829229.X, titled "Method, Device, Client Apparatus, and Electronic Device for Presenting Webpages," filed on Sep. 14, 2017 with the State Intellectual Property Office of China, the entire content of which is incorporated herein by reference.

TECHNICAL FIELD

The present disclosure relates to the field of Internet technologies, and in particular, to a method for presenting webpages, and a device, a client apparatus, and an electronic device for presenting webpages.

BACKGROUND

In the field of Internet technologies, there are typically two manners to implement a user interface for a client apparatus. The first manner is referred to as the Native manner. In the Native manner, a local application is used to implement a user interface. For example, a user interface can be implemented by a user interface framework provided by the platform SDK. The second manner is an Html-based manner. For example, a user interface can be implemented through Web View in a client apparatus and by using a compiled Html file.

The client apparatus can be a browser, or other applications installed in a terminal electronic device of a user, such as Weibo, WeChat, and the like.

In the Native manner, a user interface is implemented by API of the native platform. The user interface achieves good presentation results, and therefore the user experience is good. For different platforms, however, it is necessary to design and develop respective user interfaces. In this manner, moreover, a user interface can be updated only through updating applications.

A user interface presented in the Html-based manner is an Html page. The user interface is presented relatively poorly. Therefore, the user experience is relatively poor. However, a user interface can be dynamically updated in this manner.

Therefore, it is necessary to provide a new technical solution to improve at least one technical problem of the above current technologies.

SUMMARY

One objective of the present disclosure is to provide a novel technical solution for presenting webpages.

According to a first aspect of the present disclosure, a method for presenting a user interface is provided, comprising: receiving webpage data; obtaining, based on page presentation-related interface information in the webpage data, corresponding interface elements of a local application; and presenting a webpage of the webpage data using at least part of the interface elements of the local application.

Preferably, the webpage data comprises information flow data, and the interface information comprises a dynamic user interface template issued via a content management system.

Preferably, the webpage data is Html-based webpage data, and the interface information is Html-based interface information.

Preferably, the interface information comprises at least one of tags in Html files, styles in Cascading Style Sheets, and attribute settings of webpage elements.

Preferably, the interface elements of the local application are local interface controls implemented by an SDK-based user interface framework.

Preferably, the information flow data comprises news data scraped from the Internet.

Preferably, the information flow data comprises an identifier of a template to be used.

Preferably, the interface elements of the local application are obtained based on a preset correspondence table, and the correspondence table comprises a correspondence relationship between page presentation-related interface information in the webpage data and the interface elements of the local application.

According to a second aspect of the present disclosure, a device for presenting webpages is provided. The device comprises one or more processors; and a memory storing instructions that, when executed by the one or more processors, cause the device to perform: receiving webpage data; obtaining, based on page presentation-related interface information in the webpage data, corresponding interface elements of a local application; and presenting a webpage of the webpage data using at least part of the interface elements of the local application.

According to a third aspect of the present disclosure, a non-transitory computer readable medium is provided. The non-transitory computer readable medium comprises instructions that, when executed, cause one or more processors to perform: receiving webpage data; obtaining, based on page presentation-related interface information in the webpage data, corresponding interface elements of a local application; and presenting a webpage of the webpage data using at least part of the interface elements of the local application.

User experience can be improved according to some embodiments of the present disclosure.

Other features and advantages of the present disclosure will become clear through the detailed description of exemplary embodiments of the present disclosure below with reference to the accompanying drawings.

BRIEF DESCRIPTION OF THE DRAWINGS

Embodiments of the present disclosure are illustrated by the accompanying drawings that are incorporated in the description and become a part of the description, and the accompanying drawings and their description are used together to describe the principles of the present disclosure.

DETAILED DESCRIPTION

Various exemplary embodiments of the present disclosure will be described in detail with reference to the accompanying drawings. It should be noted that relative arrangements of parts and steps, numeric expressions and values in these embodiments do not limit the scope of the present disclosure, unless otherwise specified.

The following description of at least one exemplary embodiment is in fact illustrative only and may never be used as any limitation to the present disclosure or an application or use of the present disclosure.

It is possible that technologies, methods and devices known to those skilled in the art are not discussed in detail. In a proper situation, however, the technologies, methods and devices shall be deemed a part of the description.

In all examples illustrated and discussed herein, any particular value shall be interpreted as being illustrative only, rather than restrictive. Therefore, other examples of the exemplary embodiments may have different values.

It should be noted that similar numbers and letters represent similar items in the accompanying drawings below. Therefore, once an item is defined in one figure, it is not necessary to further discuss the item in the following figures.

Embodiments and examples of the present disclosure will be described below with reference to the accompanying drawings.

<Method>

Figure 1:
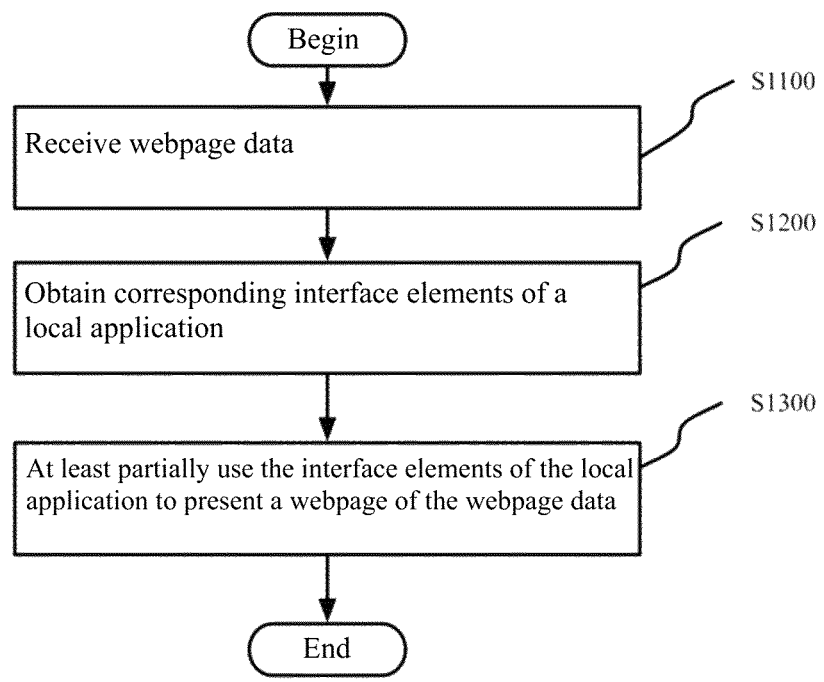
FIG. 1 is a schematic flow chart of the method according to some embodiments of the present disclosure.

FIG. 1 is a schematic flow chart of the method according to some embodiments of the present disclosure.

As shown in FIG. 1, at step S1100, webpage data is received.

At present, all webpage data is Html-based webpage data. With the development of Internet technologies, other types of webpage data may be developed. Those skilled in the art should understand that webpage data can comprise one or more of webpage files compiled with the Html language, corresponding CSS files (Cascading Style Sheets), and corresponding JavaScript files.

At step S1200, corresponding interface elements of a local application are obtained based on page presentation-related interface information in the webpage data.

A server may place information contents and page presentation-related interface information in the webpage data in one file (e.g., an Html file) and send the file to a user.

The interface information is Html-based interface information. For example, the interface information comprises at least one of tags in Html files, styles in CSS files, and attribute settings of webpage elements.

In one example, information flow data that represents information contents and interface information that represents a webpage presentation manner can be sent to a client apparatus separately. In such a circumstance, the webpage data comprises the information flow data and a dynamic user interface template issued via a content management system.

This manner can be compatible with an existing information flow push solution, and a fixed template in an existing client apparatus can be used. When a special event occurs, moreover, such as the period of National Day, a client apparatus may need a special interface to present information flow data to attract special attention from users. By using a dynamic user interface template, different user interfaces can be presented to users as needed, thereby satisfying the demand of the special event. In addition, the information flow data comprises news data scraped from the Internet. The manner in which the information flow data and the display template are arranged separately favors data processing.

For example, the information flow data comprises an identifier of a template to be used. When the information flow data is received at a client apparatus, a corresponding dynamic user interface template can be determined based on the identifier. The dynamic user interface template can be obtained before, after or at the same time as the information flow data is obtained.

Here, the interface elements of the local application are, for example, local interface controls implemented by an SDK-based user interface framework. For example, relative to an interface implemented by WebView, the local interface controls achieve better display effect and lead to better user experience.

For example, the interface elements of the local application can be obtained based on a preset correspondence table. The correspondence table comprises a correspondence relationship between page presentation-related interface information in the webpage data and the interface elements of the local application.

At step S1300, the interface elements of the local application are at least partially used to present a webpage of the webpage data.

Here, the interface elements of the local application can be used for only a part of the page elements. For example, the interface element of the local application that is used is the main part of the webpage and the part that is most prominent to users. This manner can take both user experience and processing complexity into consideration.

In the present embodiment, different user interfaces can be presented dynamically to users in a webpage form with no need to update the entire application software. In addition, the use of a local application to present a webpage when presenting a user interface achieves a good presentation effect and improves user experience.

<Device>

Those skilled in the art should understand that the above method can be embodied in a product by software, hardware, or a combination of software and hardware in the field of electronic technologies. It would be easy for those skilled in the art to generate, based on the method disclosed above, a device for presenting webpages. The device comprises means for executing all operations in the method for presenting webpages according to the above embodiment. For example, the device comprises receiving webpage data; obtaining, based on page presentation-related interface information in the webpage data, corresponding interface elements of a local application; and at least partially using the interface elements of the local application to present a webpage of the webpage data.

<Client Apparatus>

At least one embodiment of the present disclosure can be implemented in a client apparatus (or a client application), such as a browser, WeChat, Weibo, and the like.

Figure 2:
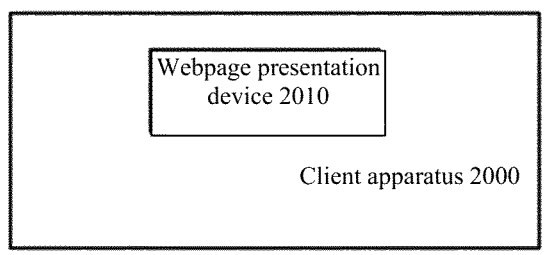
FIG. 2 is a schematic block diagram of the client apparatus according to some embodiments of the present disclosure.

FIG. 2 is a schematic block diagram of the client apparatus according to some embodiments of the present disclosure. As shown in FIG. 2, the client apparatus 2000 comprises a webpage presentation device 2010. The webpage presentation device 2010 can be a device for presenting webpages according to the above embodiment.

In addition, as described above, a client apparatus can also be generated based on the above-mentioned method, and the client apparatus can be designed to execute steps in a solution of the embodiments described with reference to FIG. 1.

It is known to those skilled in the art that with the development of electronic information technologies, such as large-scale integrated circuit technologies, and the trend of using hardware to replace software, it becomes relatively difficult to clearly find a line between software and hardware in a computer system. That is because any operation can be implemented by either software or hardware. The execution of any instruction can be performed by hardware or similarly by software. For a machine function, whether to employ a hardware implementation solution or a software implementation solution depends on non-technical factors, such as price, speed, reliability, storage capacity, modification period, and the like. For a technical professional, a software implementation manner is equivalent to a hardware implementation manner. A technical professional can choose software or hardware, as needed, to implement the above solution. Therefore, particular software or hardware is not limited herein.

<Electronic Device>

Any one of the above embodiments can be implemented in an electronic device, such as a mobile phone, a tablet computer, and the like. For example, the electronic device can comprise the device for presenting webpages according to the above embodiments or the client apparatus according to the above embodiments.

Figure 3:
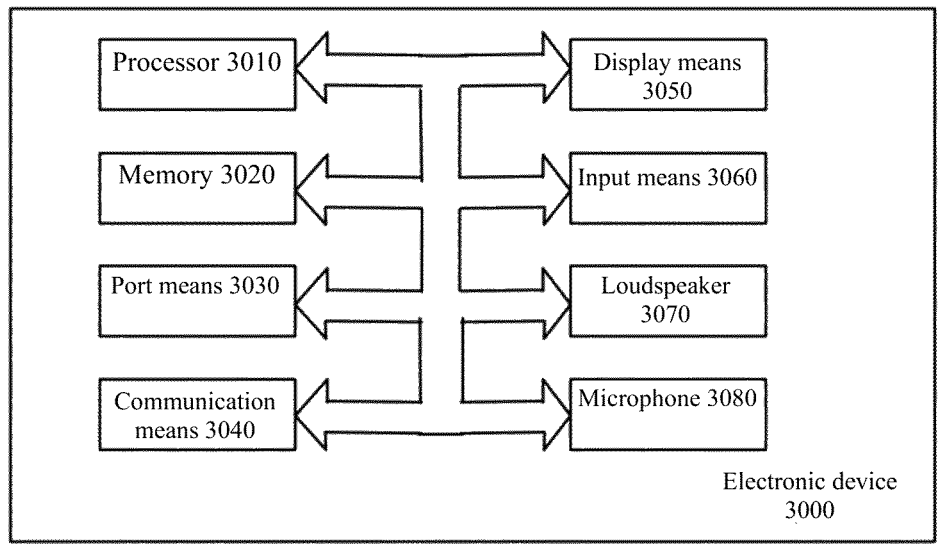
FIG. 3 is a schematic block diagram of the electronic device according to some embodiments of the present disclosure.

In addition, FIG. 3 is a schematic block diagram of the electronic device according to some embodiments of the present disclosure. As shown in FIG. 3, the electronic device 3000 can comprise a processor 3010, a memory 3020, a port means 3030, a communication means 3040, a display means 3050, an input means 3060, a loudspeaker 3070, a microphone 3080, etc.

The processor 3010 can be, for example, a central processing unit CPU, a micro-processing unit MCU, and the like. The memory 3020 can be, for example, a Read-Only Memory (ROM), a Random Access Memory (RAM), a non-volatile memory like hard disk, and the like. The port means 3030 can comprise, for example, a USB port, an earphone port, and the like.

The communication means 3040 can, for example, conduct wired or wireless communications.

The means 3050 can be, for example, a liquid crystal display, a touch screen, and the like. The input means 3060 can comprise, for example, a touch screen, a keyboard, and the like. A user can input/output voice information through the loudspeaker 3070 and the microphone 3080.

The electronic device shown in FIG. 3 is merely exemplary and is not intended to limit the present disclosure, an application or a purpose of the present disclosure in anyway.

In this embodiment, the memory 3020 is used to store an instruction, and the instruction controls, when the electronic device 3000 operates, the processor 3010 to execute operations in the method for presenting webpages described with reference to FIG. 1. Those skilled in the art should understand that a plurality of means are shown in FIG. 3, but the present disclosure can only involve some of the means, such as the processor 3010 and the memory 3020. A technical professional can design an instruction according to the solution disclosed by the present disclosure. How an instruction controls a processor to operate is known in the art and will not be described in detail herein.

EXAMPLES

Figure 4:
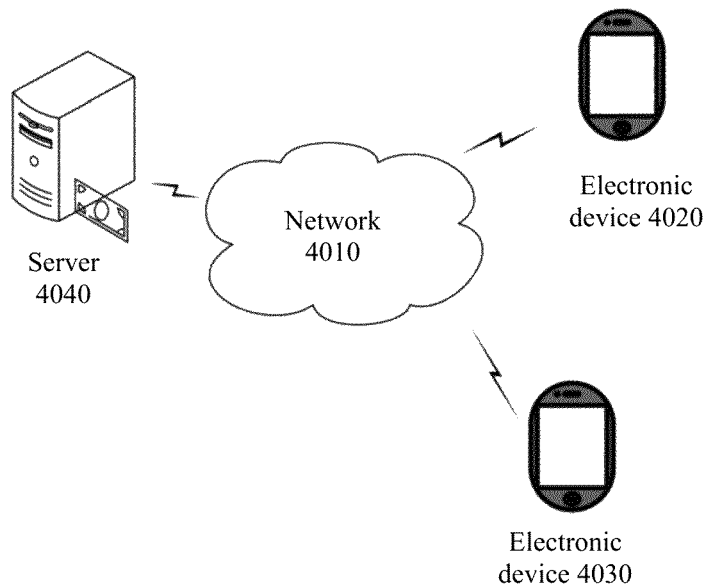
FIG. 4 is a schematic diagram of a network according to an example of some embodiments of the present disclosure.
Figure 5:
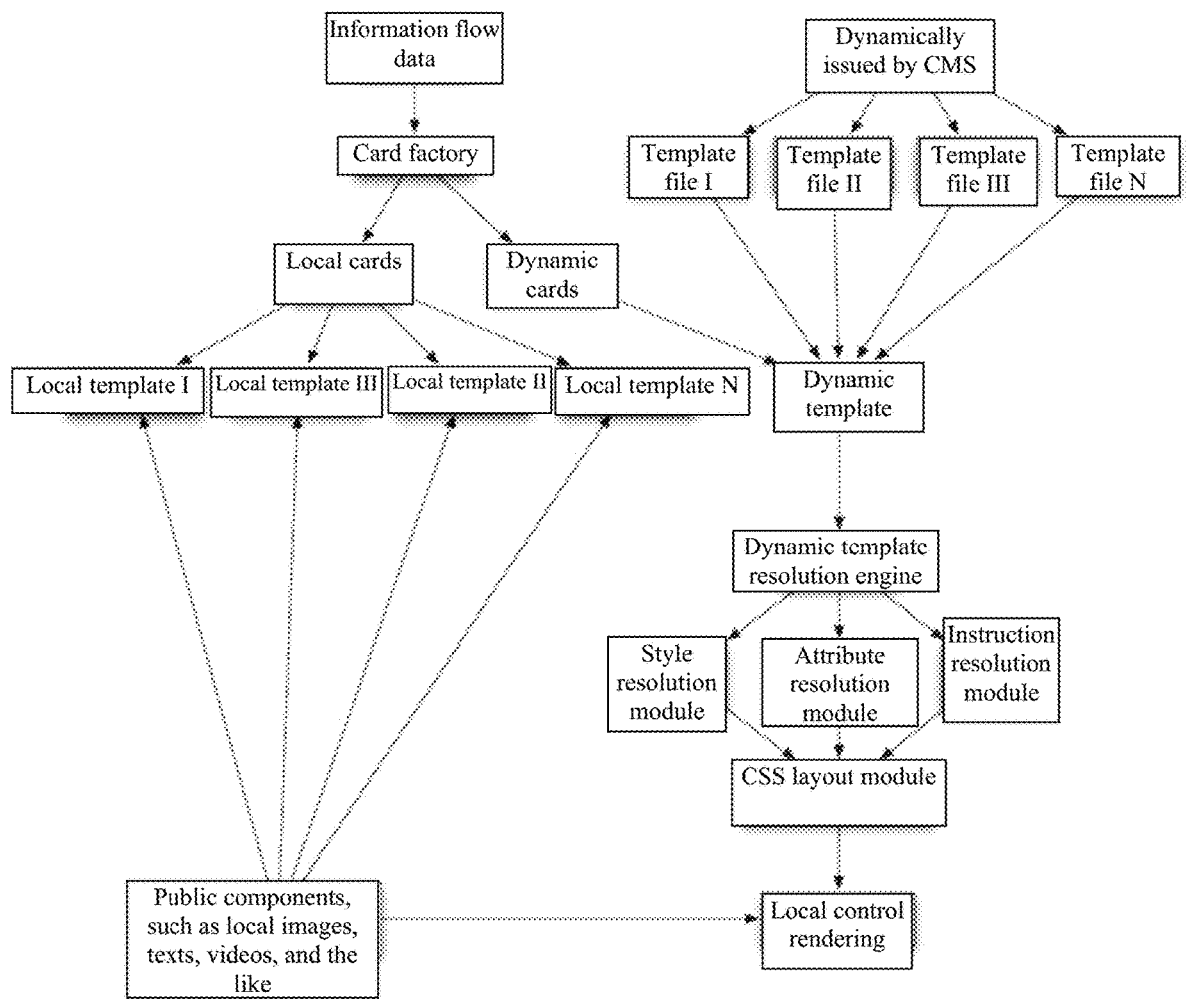
FIG. 5 is a schematic diagram of an example of some embodiments of the present disclosure.

FIG. 4 is a schematic diagram of a network according to an example of some embodiments of the present disclosure. FIG. 5 is a schematic diagram of an example of some embodiments of the present disclosure.

As shown in FIG. 4, electronic devices 4020, 4030 are connected to a server 4040 via a network 4010. The electronic devices 4020, 4030 can be, for example, user terminal electronic devices, such as smart phones, tablet computers, and the like. The server 4040 can be, for example, a Web server. The electronic devices 4020, 4030 receive webpage data from the server 4040, and display the webpage data by using a solution of any embodiment of the present disclosure.

FIG. 5 illustrates the processing of displaying information flow data by using a solution according to some embodiments of the present disclosure. For example, the processing can be achieved in the electronic devices 4020, 4030 (e.g., the processing can be achieved by a client apparatus in the electronic devices 4020, 4030).

As shown in FIG. 5, a client apparatus receives information flow data. The information flow data can be, for example, news data scraped by a web crawler. The information flow data is divided into a plurality of cards in a "card factory." The card factory here refers to a tool that can process the information flow data and convert it into a plurality of information cards. Here, each piece of information can be processed in a card form, and each information card can be presented to a user via a variety of templates.

In FIG. 5, the information flow data is divided into local cards and dynamic cards. The card factory can determine whether to use the dynamic cards. The local cards are conventional information of the information flow and are typically presented to a user by using local templates (e.g., local template I, local template II, local template III, . . . , local template N). The dynamic cards are information for special needs, such as information during Olympic Games, information regarding National Day, and the like. The dynamic cards can be presented by using dynamic templates.

As shown in FIG. 5, the client apparatus can further receive a plurality of template files dynamically issued by a content management server CMS: template file I, template file II, template file III, . . . , template file N. The content management server manages a server of dynamic user interface templates and can perform online updates of user interface templates of the client apparatus. A template can be dynamically selected from the issued templates as the template to present the dynamic cards.

The local templates are typically based on local applications and can directly use public components, such as local images, texts, videos, and the like, for presentation.

The dynamic templates are based on Html and can use WebView for presentation in normal situations. In the present example, however, a dynamic template is resolved to obtain the elements of the dynamic template, and corresponding local controls are determined to present information of dynamic cards. For example, a style resolution module, an attribute resolution module, and an instruction resolution module can be used to process styles, element attributes and instructions in the template. Subsequently, a CSS layout module can be used to perform layout on the resolved data. Unlike the current technologies, WebView is not used herein for presentation. Instead, corresponding local public components, such as local images, texts, videos, and the like, are obtained based on the obtained layout information in the manner according to the above embodiments, and the local public controls are used by a local control rendering module to present the information of the dynamic cards.

All interface elements in a dynamic template can be replaced by local interface elements. Alternatively, only some interface elements in a webpage can be replaced by local controls.

Local controls can be used to support the following labels in Html files: body, div, label, img, and button.

Local controls can be used to support the following CSS styles: display, width, height, min-height, max-height, min-width, max-width, position (absolute, relative), align-items (center, flex-end, stretch, flex-start), align-self (auto, center, flex-end, stretch, flex-start), justify-content (center, flex-end, space-between, space-around, flex-start), flex-direction (row, column), flex-wrap (nowrap, wrap), flex, top, left, right, bottom, padding, margin, overflow, -webkit, -filter, color, background-color, border-radius, border, opacity, visibility (visible, hidden), font-size, font-weight (bold), sa-number-line, sa-ellipsis, text-align (center, right, left, justify), font-family, text-decoration (line-through, underline), and line-height.

In addition, local controls can be further used to support the following attribute settings: disabled, src, onlongpress, and onclick.

Those skilled in the art should understand that the above listed contents are merely examples, and designers can select appropriate local controls according to actual needs.

Here, local controls are at least partially used to present a user interface in a webpage based on an Html file, which can achieve smooth user experience of local applications and can also possess a dynamic update capability in the Html manner.

The present disclosure can be a device, a method, and/or a computer program product. The computer program product can comprise a computer readable storage medium loaded with computer readable program instructions that enable a processor to implement all aspects of the present disclosure.

The computer readable storage medium can be a tangible device capable of retaining and storing instructions that are used by an instruction executing device. For example, the computer readable storage medium can be, but is not limited to, an electric storage device, a magnetic storage device, an optical storage device, an electromagnetic storage device, a semiconductor storage device, or any proper combination of the above devices. Examples of the computer readable storage medium (a non-exhaustive list) comprise: a portable computer disk, hard disk, Random Access Memory (RAM), Read-Only Memory (ROM), Erasable Programmable Read-Only Memory (EPROM or flash memory), Static RAM (SRAM), Compact Disk Read-Only Memory (CD-ROM), Digital Versatile Disc (DVD), memory stick, floppy disk, mechanical coding device, such as a punch card stored with instructions or a protruding structure inside a groove, and any proper combination of the above. The computer readable storage medium used herein may not be interpreted as a transient signal itself, such as radio waves, other freely propagating electromagnetic waves, electromagnetic waves propagating via a waveguide or other transmission media (e.g., an optical pulse via a fiber optic cable), or electric signals transmitted via a wire.

The computer readable program instructions described herein can be downloaded from the computer readable storage medium to computing/processing devices or can be downloaded to an external computer or an external storage device via a network, such as the Internet, a local area network, a wide area network, and/or a wireless network. The network can comprise copper transmission cables, fiber optic transmission, wireless transmission, routers, firewalls, switches, gateway computers, and/or edge servers. A network adapter card or network interface in each computing/processing device can receive computer readable program instructions from the network and forward the computer readable program instructions for storage in a computer readable storage medium in each computing/processing device.

A computer program instruction for executing operations of the present disclosure can be an assembled instruction, an Instruction Set Architecture (ISA) instruction, a machine instruction, a machine-related instruction, a micro-code, a firmware instruction, state setting data, or source code or target code compiled in any combination of one or more programming languages. The programming languages comprise object-oriented programming languages, such as Smalltalk, C++, and the like, as well as conventional procedural programming languages, such as C or similar programming languages. The computer readable program instructions can be fully executed on a user's computer, partially executed on a user's computer, executed as an independent software package, partially executed on a user's computer and partially executed on a remote computer, or fully executed on a remote computer or server. In a situation involving a remote computer, the remote computer can be connected to a user's computer via any type of network, including local area network (LAN) or wide area network (WAN), or the remote computer can be connected to an external computer (e.g., connecting via the Internet by using an Internet service provider). In some embodiments, state information of the computer readable program instructions can be used to personalize and customize an electronic circuit, such as a programmable logic circuit, a field-programmable gate array (FPGA) or a programmable logic array (PLA). The electronic circuit can execute computer readable program instructions, thereby implementing all aspects of the present disclosure.

All aspects of the present disclosure are described here with reference to flow charts and/or block diagrams of the method, apparatus (system) and computer program product of embodiments of the present disclosure. It should be understood that every block of the flow charts and/or block diagrams and a combination of blocks of the flow charts and/or block diagrams can be implemented by computer readable program instructions.

These computer readable program instructions can be provided to a general-purpose computer, a dedicated computer, or a processor of another programmable data processing device, thereby producing a machine and causing these instructions to, when executed by the computer or the processor of another programmable data processing device, produce an apparatus implementing functions/actions specified in one or more blocks in the flow charts and/or block diagrams. These computer readable program instructions can also be stored in a computer readable storage medium. These instructions enable a computer, a programmable data processing device, and/or other devices to work in a particular manner. Therefore, the computer readable medium stored with instructions comprises a manufactured article that includes an instruction for implementing all aspects of functions/actions specified in one or more blocks in the flow charts and/or block diagrams.

The computer readable program instructions can also be loaded onto a computer, other programmable data processing devices, or other devices, causing a series of operating steps to be executed on the computer, other programmable data processing devices, or other devices to produce a process of computer implementation, thereby enabling instructions executed on the computer, other programmable data processing devices, or other devices to implement functions/actions specified in one or more blocks in the flow charts and/or block diagrams.

The flow charts and block diagrams in the accompanying drawings illustrate system architectures, functions and operations that may be implemented for the systems, methods, and computer program products according to a plurality of embodiments of the present disclosure. With regard to this point, every block in the flow charts or block diagrams can represent a part of a module, program segment or instruction. The part of module, program segment or instruction comprises one or more executable instructions for implementing prescribed logic functions. In some alternative implementations, functions labeled in the blocks can also take place in an order different from the one labeled in the accompanying drawings. For example, two consecutive blocks can actually be executed substantially in parallel, or they can be sometimes executed in an opposite order, which depends on the involved functions. It should also be noted that every block of the flow charts and/or block diagrams and a combination of blocks of the flow charts and/or block diagrams can be implemented by a dedicated hardware-based system for executing prescribed functions or actions or by a combination of dedicated hardware and computer instructions. It is known to those skilled in the art that implementation in a hardware manner, implementation in a software manner, and implementation in a manner of combined software and hardware are equivalent.

The embodiments of the present disclosure have been described above. The description above is exemplary, rather than exhaustive, and is not limited to the disclosed embodiments. It would be obvious to those skilled in the art that many amendments and variations can be made without departing from the scope and spirit of the described embodiments. The terms herein are selected to explain principles, practical applications or technical improvements of the embodiments to the technologies on the market in an optimal manner, or to enable those skilled in the art to understand the embodiments disclosed herein. The scope of the present disclosure shall be subject to the appended claims.

What is claimed is:

1. A method for presenting webpages, comprising:
   receiving webpage data;
   obtaining, based on page presentation-related interface information in the webpage data, corresponding interface elements of a local application, separately from the webpage data; and
   presenting a webpage of the webpage data using at least part of the interface elements of the local application, wherein the interface elements of the local application are obtained based on a preset correspondence table, the preset correspondence table comprising a correspondence relationship between the page presentation-related interface information in the webpage data and the interface elements of the local application.

2. The method according to claim 1, wherein the webpage data comprises information flow data, and the interface information comprises a dynamic user interface template issued via a content management system.

3. The method according to claim 2, wherein the information flow data comprises news data scraped from the Internet.

4. The method according to claim 3, wherein the information flow data comprises an identifier of a template to be used.

5. The method according to claim 1, wherein the webpage data includes Html-based webpage data, and the interface information includes Html-based interface information.

6. The method according to claim 5, wherein the interface information comprises at least one of tags in Html files, styles in Cascading Style Sheets, and attribute settings of webpage elements.

7. The method according to claim 1, wherein the interface elements of the local application are local interface controls implemented by an SDK-based user interface framework.

8. A device for presenting webpages, comprising:
   one or more processors; and
   a memory storing instructions that, when executed by the one or more processors, cause the device to perform:
   receiving webpage data;
   obtaining, based on page presentation-related interface information in the webpage data, corresponding interface elements of a local application, separately from the webpage data; and
   presenting a webpage of the webpage data using at least part of the interface elements of the local application, wherein the interface elements of the local application are obtained based on a preset correspondence table, the preset correspondence table comprising a correspondence relationship between the page presentation-related interface information in the webpage data and the interface elements of the local application.

9. The device according to claim 8, wherein the webpage data comprises information flow data, and the interface information comprises a dynamic user interface template issued via a content management system.

10. The device according to claim 9, wherein the information flow data comprises news data scraped from the Internet.

11. The device according to claim 10, wherein the information flow data comprises an identifier of a template to be used.

12. The device according to claim 8, wherein the webpage data includes Html-based webpage data, and the interface information includes Html-based interface information.

13. The device according to claim 12, wherein the interface information comprises at least one of tags in Html files, styles in Cascading Style Sheets, and attribute settings of webpage elements.

14. The device according to claim 8, wherein the interface elements of the local application are local interface controls implemented by an SDK-based user interface framework.

15. A non-transitory computer readable medium, comprising instructions that, when executed, cause one or more processors to perform:
   receiving webpage data;
   obtaining, based on page presentation-related interface information in the webpage data, corresponding interface elements of a local application, separately from the webpage data; and
   presenting a webpage of the webpage data using at least part of the interface elements of the local application, wherein the interface elements of the local application are obtained based on a preset correspondence table, the preset correspondence table comprising a correspondence relationship between the page presentation-related interface information in the webpage data and the interface elements of the local application.

16. The non-transitory computer readable storage medium according to claim 15, wherein the webpage data comprises information flow data, and the interface information comprises a dynamic user interface template issued via a content management system.

17. The non-transitory computer readable storage medium according to claim 15, wherein the interface elements of the local application are local interface controls implemented by an SDK-based user interface framework.

\* \* \* \* \*